United States Patent
Best et al.

(10) Patent No.: US 8,487,787 B2
(45) Date of Patent: Jul. 16, 2013

(54) NEAR-TO-EYE HEAD TRACKING GROUND OBSTRUCTION SYSTEM AND METHOD

(75) Inventors: Carl A. Best, Glendale, AZ (US); Frank Cupero, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 400 days.

(21) Appl. No.: 12/894,452

(22) Filed: Sep. 30, 2010

(65) Prior Publication Data
US 2012/0081236 A1 Apr. 5, 2012

(51) Int. Cl.
*G08G 5/04* (2006.01)

(52) U.S. Cl.
USPC ............ 340/961; 340/933; 340/980; 340/937; 340/972; 340/963; 345/7; 348/144; 701/14

(58) Field of Classification Search
USPC ................ 340/961, 945, 972, 958, 980, 933, 340/937; 701/14; 359/13; 345/7; 348/144
See application file for complete search history.

(56) References Cited

U.S. PATENT DOCUMENTS

| | | | |
|---|---|---|---|
| 5,745,054 A | 4/1998 | Wilkens | |
| 6,512,975 B2* | 1/2003 | Watson | 701/120 |
| 7,109,889 B2 | 9/2006 | He | |
| 7,342,514 B1* | 3/2008 | Bailey et al. | 340/961 |
| 7,382,288 B1* | 6/2008 | Wilson et al. | 340/972 |
| 7,564,372 B1 | 7/2009 | Bailey et al. | |
| 7,605,774 B1 | 10/2009 | Brandt et al. | |
| 7,619,626 B2 | 11/2009 | Bernier | |
| 7,679,528 B1 | 3/2010 | Etherington et al. | |
| 2005/0232512 A1 | 10/2005 | Luk et al. | |
| 2006/0066459 A1 | 3/2006 | Burch et al. | |
| 2007/0241936 A1 | 10/2007 | Arthur et al. | |
| 2009/0303082 A1 | 12/2009 | Larson et al. | |
| 2010/0017047 A1 | 1/2010 | Sanders-Reed | |
| 2010/0026525 A1 | 2/2010 | Feyereisen et al. | |
| 2010/0125412 A1 | 5/2010 | Suddreth et al. | |
| 2010/0156673 A1* | 6/2010 | Grothe | 340/961 |
| 2010/0324807 A1* | 12/2010 | Doose et al. | 701/120 |
| 2011/0199202 A1* | 8/2011 | De Mers et al. | 340/439 |
| 2012/0140070 A1* | 6/2012 | De Mers et al. | 348/144 |

FOREIGN PATENT DOCUMENTS

| | | |
|---|---|---|
| EP | 2133729 A1 | 12/2009 |
| EP | 2182402 A1 | 5/2010 |
| WO | 2009010969 A2 | 1/2009 |
| WO | 2009010969 A3 | 1/2009 |

OTHER PUBLICATIONS

Vailmont, B. et al.; When the Wheels Touch Earth and the Flight is Through, Pilots Find One Eye is Better Than Two; Proceedings of the 2009 SPIE Defense, Security, & Sensing; Orlando, FL Apr. 13-17, 2009.
EP Search Report, EP 11 183 156.6 dated Jan. 18, 2012.
EP Examination Report, EP 11 183 156.6 dated Jan. 30, 2012.

* cited by examiner

*Primary Examiner* — Brent Swarthout
(74) *Attorney, Agent, or Firm* — Ingrassia Fisher & Lorenz, P.C.

(57) ABSTRACT

A near-to-eye display allows an operator of a vehicle, such as a pilot of an aircraft, to see an obstacle on a conformal pathway, such as a runway or taxiway. The obstacle may be boundaries of the pathway or an object captured by an optional Infrared camera.

8 Claims, 6 Drawing Sheets

NEAR-TO-EYE HEAD TRACKING GROUND OBSTRUCTION SYSTEM AND METHOD

TECHNICAL FIELD

The exemplary embodiments described herein generally relates to aircraft ground operations and more particularly to displaying conformal taxiways and obstacles to a pilot of a taxing aircraft.

BACKGROUND

It is important for pilots to know the layout of the taxiways and runways when taxing for takeoff or from landing. Navigation of an airport surface (taxiways/runways) can be as difficult (from a pilot's workload perspective) and dangerous (from an aviation safety perspective) as the airborne portion of the flight, especially in limited visibility of night and/or weather, or at unfamiliar airports. An increase in pilot workload typically results in decreased safety: the pilot must interpret the information provided on the screen occupying her thought processes when she may have many other decisions to make. Undesired results include taxing onto unapproved taxiways/runways, not being made aware of an obstacle, and becoming disorientated while taxing.

Traditionally, pilots have relied upon paper charts to gain knowledge of the airport layout and understand their position within, and how to navigate, the airport taxiway/runway matrix. More recently, this information has been made available to the pilot by electronic flight bags and electronic chart readers. However, these known electronic displays are typically monochromatic and without any prominence provided for runways and critical markers, making it difficult for the pilot to properly discern between taxiways, runways, and obstacles such as construction and slopes in the taxiway.

As the operation of vehicles such as airplanes becomes more complex, it is preferable that the vehicle operator (e.g., the flight crew) be attentive and receive information in a timely manner to ensure proper operation. One means for providing information is a near-to-eye (NTE) display system. A NTE display system is a type of head worn display (HWD) system which uses a visor, a helmet, or a cap to place a display in front of one or both eyes. Typically the NTE display is semi-transparent (such as a liquid crystal display (LCD), liquid crystal on silicon (LCos) display, or organic light emitting diode (OLED) display) so that the information presented on the NTE display appears to the user superimposed on the visible scene. For example, a NTE display can provide a three-dimensional view of a scene outside the vehicle for use by the vehicle's operator even in poor visibility conditions, such as thick fog conditions.

Accordingly, it is desirable to provide a method and system displaying runway edges and obstacles in a airport taxi environment that may be more easily understood by the pilot. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A method and apparatus are provided for displaying obstacles to an operator of a vehicle while moving along a path. The apparatus comprises a near-to-eye (NTE) display device that allows an operator of the vehicle to see an obstacle on, including the conformal edges of, a pathway of the vehicle.

In an exemplary embodiment, a method of presenting an obstacle on a near-to-eye display to an operator of a vehicle, comprises determining a path on which the vehicle may travel; determining a location of the vehicle on the path; determining a location of the obstacle on the path; and displaying a graphical representation of the path and the obstacle on the near-to-eye system.

In another exemplary embodiment, a method of displaying a taxiway and an obstacle on a near-to-eye display to a pilot of an aircraft, comprises obtaining dimensions of the taxiway on which the aircraft is taxing, the taxiway defined by boundaries; determining the position of the aircraft on the taxiway; displaying the taxiway including the boundaries on the near-to-eye system worn by the pilot; providing a real time video from an infrared camera positioned on the aircraft and focused to display the taxiway or runway for identifying an obstacle, the infrared camera being synced to the direction of the gaze of the pilot as determined by the near-to-eye system; and displaying the obstacle on the near-to-eye system In yet another exemplary embodiment, a system for viewing boundaries of a taxiway on which an aircraft is taxing, comprises a near-to-eye display configured to be positioned adjacent an eye of a pilot of the aircraft; a flight management system configured to provide dimensions of the taxiway; a navigation system configured to determine the location of the aircraft on the taxiway; and a controller configured to provide, in response to the dimensions of the taxiway and the location of the aircraft, data including boundaries of the taxiway to the near-to-eye display for display thereon.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

The exemplary embodiments described herein include a near-to-eye (NTE) display device that allows the pilot of an aircraft to see an obstacle on, including the conformal edges of, the runway or taxiway. An NTE head tracking system provides a left to right range of motion, for example, 180 degrees, for visual scanning. Graphics generated for display tracks to the pilot's eye gaze. Input from a gimbaled head tracking Infrared camera gives the pilot the ability to scan the runway/taxiway for obstructions. A pixel to pixel linear interpolation of the video input will provide a movement and direction of a possible obstruction relative to the aircraft, thereby alerting the pilot to the hazard.

The airport runway/taxiway information may be provided by the aircraft flight management system (FMS). The aircraft's position may be determined from a global positioning system (GPS) or other sensors. While the system continually processes the runway/taxiway edges and obstacles, the presentation on the NTE display optionally may be initiated only when the need is determined.

Techniques and technologies may be described herein in terms of functional and/or logical block components, and with reference to symbolic representations of operations, processing tasks, and functions that may be performed by various computing components or devices. Such operations, tasks, and functions may be referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
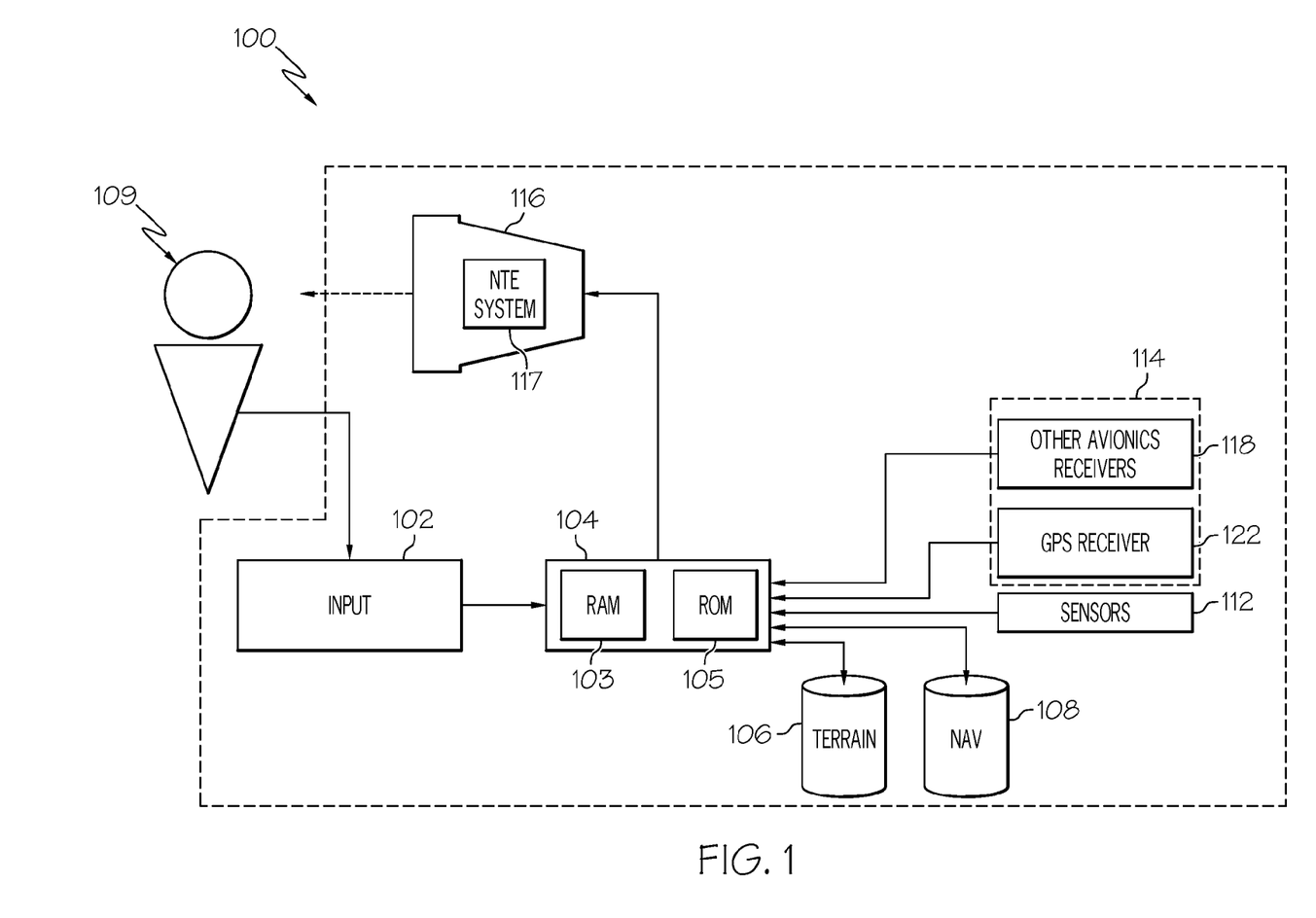
FIG. 1 is a functional block diagram of a flight display system.

Though the method and system of the exemplary embodiments may be used in any type of mobile vehicle, for example, automobiles, ships, and heavy machinery, the use in an aircraft system is described as an example. Referring to FIG. 1, a flight deck display system 100 includes a user interface 102, a processor 104, one or more terrain databases 106 (including runway and taxiway information), one or more navigation databases 108, sensors 112, external data sources 114, and one or more display devices 116 (including the NTE system 117 subsequently discussed in more detail). The user interface 102 is in operable communication with the processor 104 and is configured to receive input from a user 109 (e.g., a pilot) and, in response to the user input, supplies command signals to the processor 104. The user interface 102 may be any one, or combination, of various known user interface devices including, but not limited to, one or more buttons, switches, knobs, and touch panels (not shown).

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the taxiways and runways over which the aircraft is taxiing, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. In at least one described embodiment, the sensors 112 include an Infrared camera. The other avionics receivers 118 include, for example, an ILS receiver and a GPS receiver. The ILS receiver provides aircraft with horizontal (or localizer) and vertical (or glide slope) guidance just before and during landing and, at certain fixed points, indicates the distance to the reference point of landing on a particular runway. The ILS receiver may also give ground position. The GPS receiver is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various flat panel displays such as various types of LCD (liquid crystal display), TFT (thin film transistor) displays, and projection display LCD light engines. The display devices 116 may additionally be implemented as a panel mounted display, or any one of numerous known technologies.

As previously noted, the display devices 116 include a near-to-eye (NTE) display system 117. There are many known NTE systems. The preferred exemplary embodiment, described in U.S. patent application Ser. No. 12/707,293 and shown in FIG. 2, includes the operator 109 of a vehicle, such as a flight crew member of an aircraft, wearing a near-to-eye (NTE) display system 117. The NTE display system 117 includes a headband 206 coupled to a semi-transparent display 208 such that when correctly worn by the operator 109, the semi-transparent display 208 is placed in the line of sight of the right eye 210 at a predetermined distance from the right eye 210. In this manner, information can be presented to the operator 109 on the semi-transparent display 208 superimposed on the visible scene beyond, for example, the controls and other items inside the cockpit and/or the outside view through the window of the cockpit Infrared light emitting diodes (LEDs) 214 are located on a portion 212 of the headband 206 to sense a direction of gaze of the operator 109 (e.g. looking up, looking down, looking at one portion of a cockpit or another portion, etc.) at any point in time in order to present appropriate information on the display 208.

Figure 2:
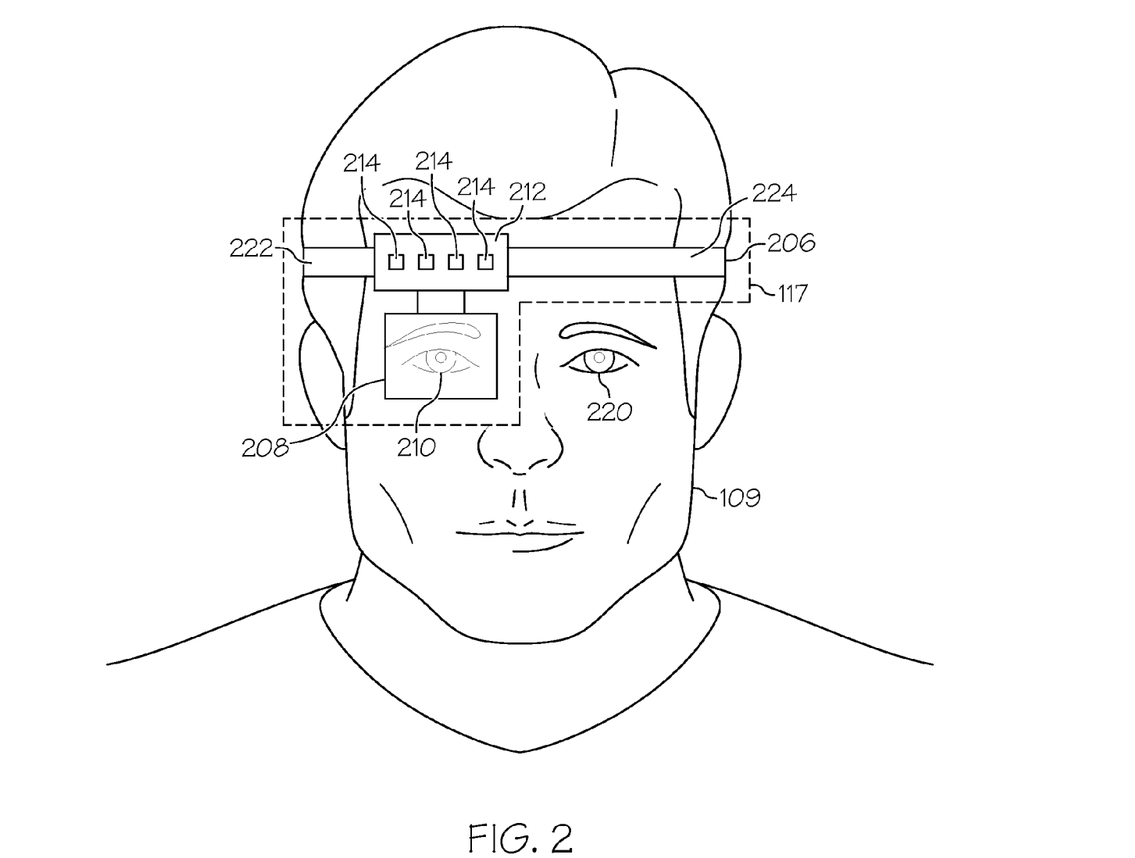
FIG. 2 is an exemplary embodiment of a near-to-eye display system.

Outside their use in the NTE display system 117, the LEDs 214 are utilized to provide more detailed information about the state and actions of the operator 109. The NTE display system 117 is configured to monitor the head position of operator 109 by monitoring the position and orientation of the NTE display device (i.e., the NTE display system 117). In this manner, the operator's direction of gaze at any point in time can be sensed for generation and presentation of an appropriate transparent view including conformal graphics and/or other information on the display 208.

The configuration of the NTE display system 117 is not limited to the device shown in FIG. 2. For example, while the NTE display system 117 is a monocular NTE display system, a binocular NTE display system could also be employed in the present embodiment. In addition, while the monocular NTE display system 117 in accordance with the present embodiment has the display 208 situated over the right eye 210, the present embodiment could also use a monocular NTE display system having the display positioned in the line of sight of the left eye 220. Further, while the LEDs 214 are incorporated in the portion 212 of the headband 206, the number and location of the LEDs 214 can be anywhere on the headband 206, such as in portion 222 or portion 224, or even located around the display 214.

The LEDs 214 are infrared in order to emit wavelengths not visible to the operator 109 and thereby not interfere with operation of the aircraft and/or the view of the operator 109. In addition, the LEDs 214 are positioned on the headband 206 to allow sensing of the position and orientation of the NTE display system 117. The present embodiment, however, is not limited to the use of infrared LEDs or, in fact, is not limited to the use of LEDs 214, and may include any reflective or emissive device attachable to the NTE display system 117 that would allow sensing of the position and orientation of the NTE display system 117 and, consequently, determination of the direction of gaze or focus of the pilot.

Figure 3:
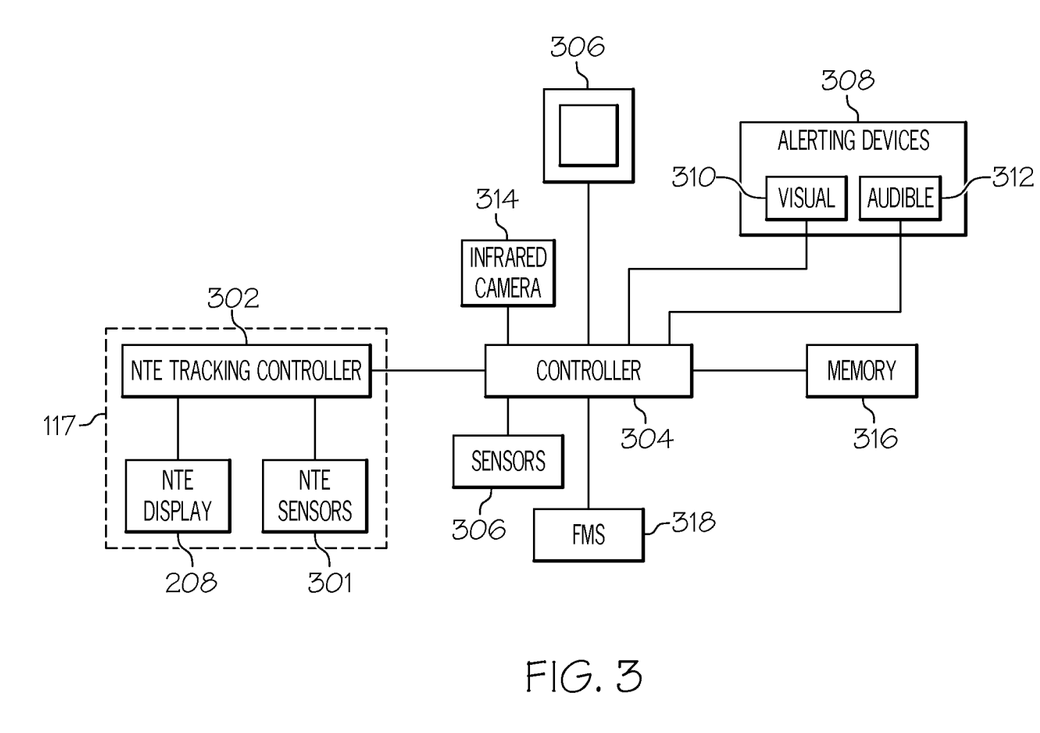
FIG. 3 is a functional block diagram of the near-to-eye display system of FIG. 2.

FIG. 3 depicts a block diagram of a system 300 for aircraft operation in accordance with the present embodiment. The NTE display system 117 includes an NTE display 208, the NTE sensors 301 and a NTE tracking controller 302. The NTE tracking controller 302 receives signals from the NTE sensors 301, such as cockpit cameras (not shown) or infrared sensors 214, and generates signals which are provided to the display 208. The signals present appropriate information on the display 208 for generating the view of conformal graphics or other information for presentation to the operator 109.

In accordance with the present embodiment, the NTE tracking controller 302 also generates focus data corresponding to the direction of gaze of the operator 109 in response to the information monitored by the NTE sensors 301, for example, whether the operator 109 is looking out the window (not shown) and in which direction, at the in-cockpit displays 306, or at some other point of interest. The NTE tracking controller 302 is coupled to a controller 304 for providing the focus data corresponding to the direction of gaze of the operator 109 thereto. The focus data (e.g., the operator head tracking data resulting from monitoring the position and orientation of the NTE display system 117) is utilized by the controller 304 for several purposes.

First, the focus data is used for initiating a change in system operation and/or adaptive operation of cockpit alerting devices. Additional avionics sensors 306 are coupled to the controller 304 and when triggered, initiate a change in system operation or provide operator sensible alerts to the flight crew. A change in system operation may include changing the information and or visual presentation on one of the display monitors 306 or moving a visual presentation of flight information from one of the display monitors 306 to another one of the display monitors 306. The controller 304 may initiate such change in system operation in response to the focus data corresponding to the direction of gaze of the operator 109 received from the NTE controller 302.

In accordance with the preferred embodiments, data representative of the dimensions and location of the taxiway (and optionally the runway), and specifically its boundaries, on which the aircraft is taxiing are provided to the processor 104 and the NTE tracking controller 302 from the terrain database 106. The location of the aircraft is determined, preferably by GPS coordinates obtained from the GPS receiver 118. The data provided by the processor 104 is converted to a video for presentation on the NTE display 208.

Additionally, an Infrared camera 314 is positioned on the aircraft for imaging any obstacles in its view within taxiing distance of the aircraft. The forward looking Infrared camera 314 can operate in any one of three modes. It may display the images as Infrared images in a first mode of operation, being gimbaled to the pilot's glaze by the NTE display system 117. In this first mode, the Infrared camera 314 preferably can rotate about 180 degrees, 90 degrees to either direction from the nose of the aircraft and in a plane with the taxiway, and is coupled to the NTE controller 302 (through the controller 304) for displaying the video taken by the Infrared camera 314 on the NTE display 208. In a second mode, it can operate in a graphics processing mode where the image is shown only as a threat circle with a center dot. The center dot becomes a line indicting a direction when the pixel to pixel interpolation algorithm detects a movement. The threat circle can grow in size when approached by the aircraft. In a third mode, it can supplement the conformal edges of the runway (or taxiway) by graphic processing the runway light's position and subtract that known distance from the conformal edge of the runway (or taxiway). In this mode the image is not shown, but the light intensity and position is processed to aid in the positioning of the conformal edges of the runway (or taxiway). A similar mode of graphic processing can be applied to the reflective center line of the runway (or taxiway).

Figure 4:
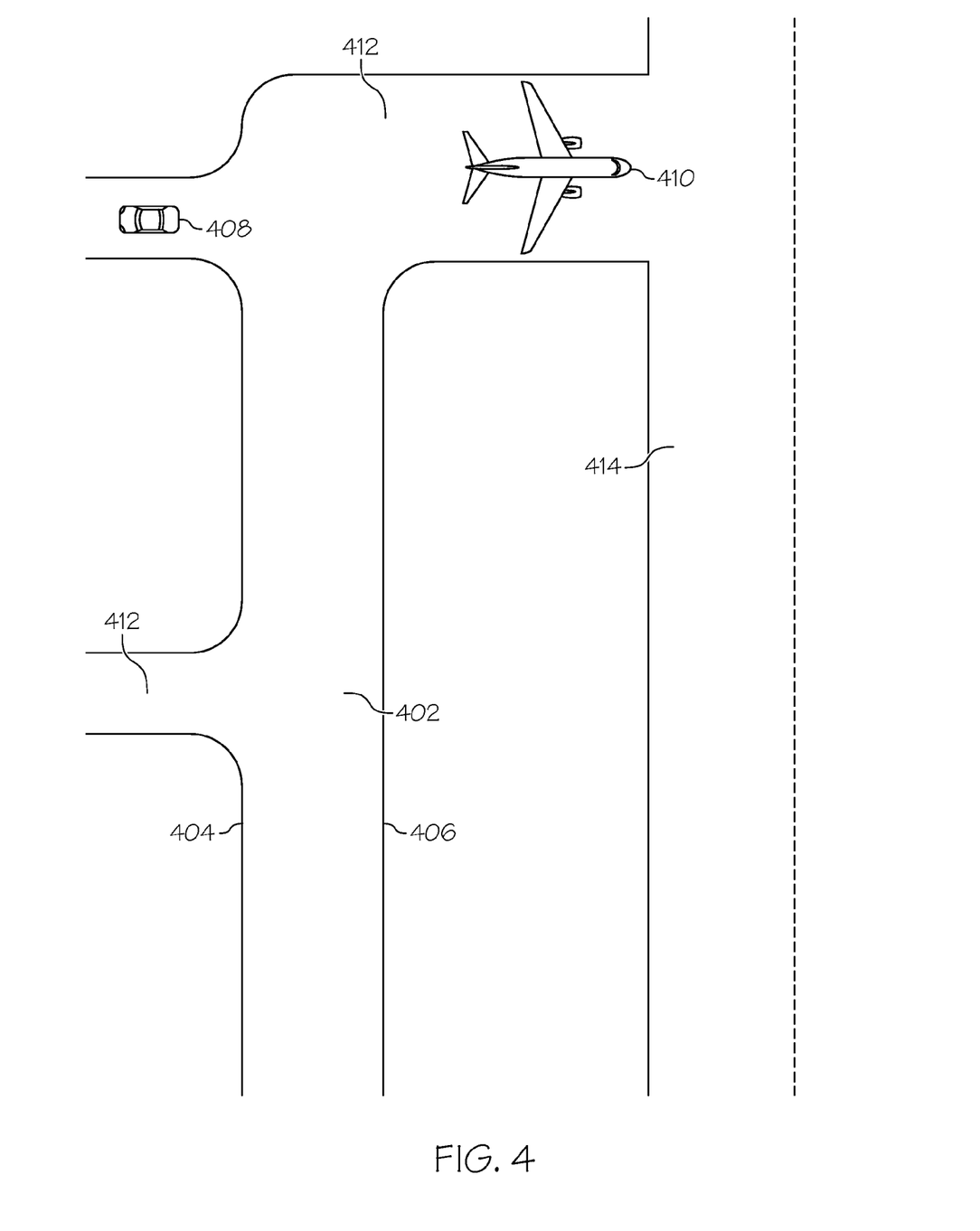
FIG. 4 is an exemplary view from an aircraft of the birds eye view ahead.
Figure 5:
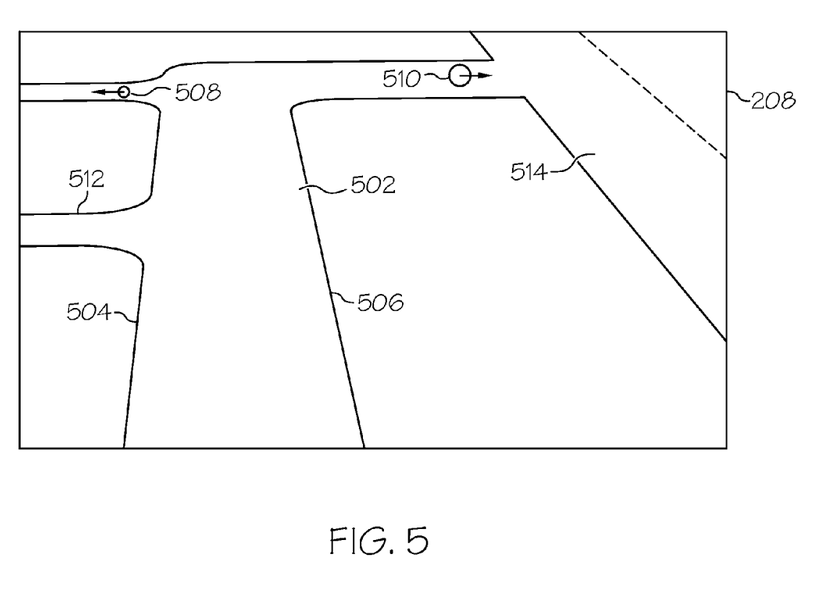
FIG. 5 is an exemplary view on the conformal near-to-eye display of the view of FIG. 4.

Referring to FIG. 4, a bird's eye view of the actual environment ahead of the aircraft is shown. In operation, as the pilot taxies the aircraft on the taxiway 402, an image (video) of the taxiway 402 and optionally other taxiways 412 or the runway 414 are presented on the NTE display 208 (FIG. 5). Preferably, the boundaries 404, 406 of the displayed taxiway 402, and an obstacle when present, for example a truck 408 or another aircraft 410 when present, are highlighted in some manner on the conformal NTE display. For example, the boundaries 404, 406 and obstacle 408, 410 may be of a different format than other items displayed, for example, brighter, a different color, or thicker.

Referring to FIG. 5, the presentation on the conformal NTE display includes the taxiway 502, boundaries 504, 506 of the taxiway 502, taxiway 512, runway 514, truck 508, and aircraft 510. Obstacles, such as the truck 508 and aircraft 510, are, for example, shown as a threat circle. An arrow protruding from the circles 508, 510 indicate any movement of the obstacle 508, 510. For example, the truck 508 is moving to the left away from the taxiway 502 and the aircraft 510 is moving towards/onto the runway 514.

Furthermore, the boundaries 404, 406 of the taxiway 402 and/or the obstacle 408, 410 may be displayed only when the processor 104 has determined they present a hazard. An alert by one of the alerting devices 308 may be initiated at that time.

Operator sensible alerts are alerts that can be sensed by an operator, such as visual or audible alerts. Since the focus data indicates where the pilot's head (and potentially direction of gaze) are pointed, the controller 304 decides where and/or how to present an alert to warn the operator 109 of a condition requiring attention such as the approach to an obstacle or taxiway boundaries. Therefore, when the avionics sensors 306 are triggered, an alert signal is provided to the controller 304. The controller 304 then activates one or more of several cockpit alerting devices 308 selected in response to the focus data corresponding to the direction of gaze of the operator 109.

As described above, the cockpit alerting devices 308 may include visual alerting devices 310 and audible alerting devices 312 in one or more areas of the cockpit. The controller 304 determines whether to provide the alert signal to one of the visual alerting devices 310 and/or one of the audible alerting devices 312 in response to the approach to an obstacle or taxiway boundaries by selecting between the visual alerting devices 310 and the audible alerting devices 312 in response to the focus data received from the NTE tracking controller 302. Accordingly, a visual alert could be repositioned from one of the visual alerting devices 310 to another one of the visual alerting devices 310 within the direction of focus or gaze of the operator 109 or to the NTE display 208 as determined by the focus data. Alternatively or additionally, the controller 304 may decide to present an audible tone from one of the audible alerting devices 312 rather than a flashing light from a visual alerting device 310 or the NTE display 208 to warn the operator 109 of a condition requiring an action by the pilot 109.

In addition, if the NTE tracking controller 302 determines that the focus of the operator 109 is on a head down display 306 (for example), the controller 304 may determine to provide the alert signal to the operator 109 by providing signals to the head down display 306 to present an alert message on the head down display 306 in response to the focus data received from the NTE tracking controller 302. For example, the operator 109 could be directed to look outside the cockpit by a message and/or instructions on the head down display 306. The alert message on the head down display 306 could be a specific alphanumeric message or could be a change of the visual presentation or any portion thereof, such as a change of the background, a change of the color, or a flashing of the visual presentation.

In the system 300, the NTE tracking controller 302 for determining the focus (direction) of the operator 109 and the controller 304 for controlling the alert operation of the aircraft are depicted as two separate controllers. For distributed operation, separate controllers would be appropriate. However, the present embodiment is not limited to such distributed computing and those skilled in the art will realize that both determining the focus of the operator 109 and controlling the alert operation of the aircraft could be implemented in a single controller.

Figure 6:
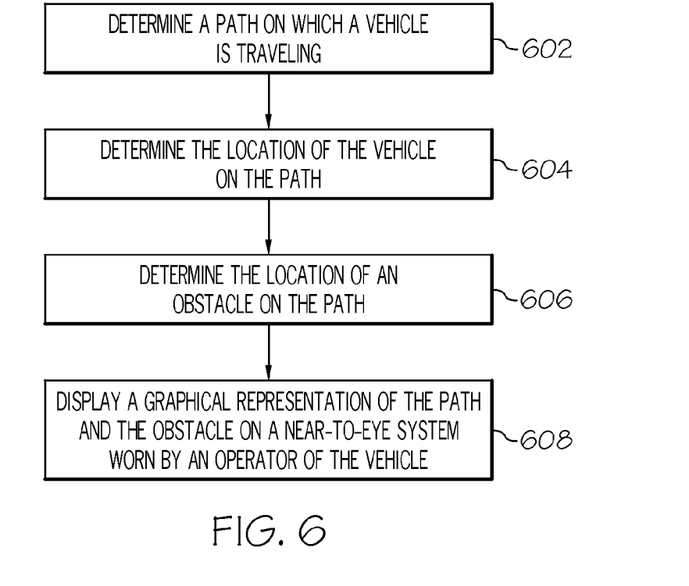
FIG. 6 is a flow chart in accordance with an exemplary embodiment.
Figure 7:
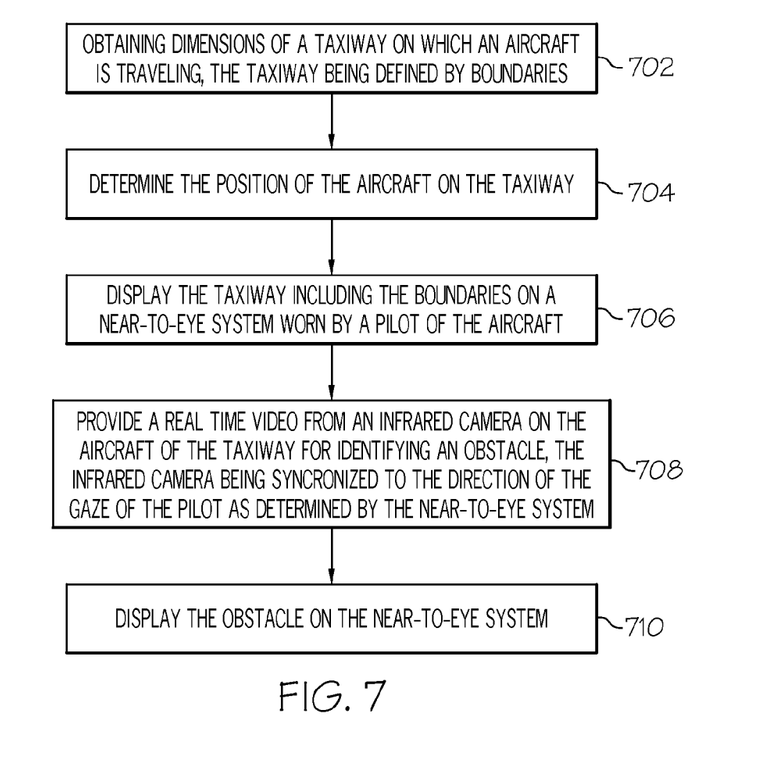
FIG. 7 is a flow chart in accordance with another exemplary embodiment.

FIGS. 6 and 7 are flow charts that illustrate exemplary embodiments 600, 700 of a NTE display system 117 for presenting obstacles, including pathway boundaries, suitable for use with moving vehicles. The various tasks performed in connection with the embodiments 600, 700 may be performed by software, hardware, firmware, or any combination thereof. For illustrative purposes, the following description may refer to elements mentioned above in connection with FIGS. 1-3. In practice, portions may be performed by different elements of the described system, e.g., a processor, a display element, or a data communication component. It should be appreciated that the embodiments 600, 700 may include any number of additional or alternative tasks, the tasks shown in FIG. 6 and need not be performed in the illustrated order, and the embodiments 600, 700 may be incorporated into a more comprehensive procedure or process having additional functionality not described in detail herein. Moreover, one or more of the tasks shown in FIGS. 6 and 7 could be omitted from the embodiment 600, 700 as long as the intended overall functionality remains intact.

The exemplary embodiment 600 of FIG. 6 includes determining 602 a path on which a vehicle is traveling, determining 604 the location of the vehicle on the path, determining 606 the location of an obstacle on the path, and displaying 608 a graphical representation of the path and the obstacle on a near-to-eye system worn by an operator of the vehicle.

The exemplary embodiment 700 of FIG. 7 includes obtaining 702 dimensions of a taxiway on which an aircraft is traveling, the taxiway being defined by boundaries, determining 704 the position of the aircraft on the taxiway, displaying 706 the taxiway including the boundaries on a near-to-eye system worn by a pilot of the aircraft, providing 708 a real time video from an infrared camera on the aircraft of the taxiway for identifying an obstacle, the infrared camera being synchronized to the detection of the gaze of the pilot as determined by the near-to-eye system, and displaying 710 the obstacle on the near-to-eye system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of displaying an obstacle and at least one of a runway and a taxiway on a near-to-eye display to a pilot of an aircraft, comprising:
    obtaining dimensions of the runway or taxiway on which the aircraft is taxiing;
    defining a conformal runway or taxiway defined by boundaries;
    determining the position of the aircraft on the runway or taxiway;
    displaying the conformal runway or taxiway including the boundaries on the near-to-eye display only when the aircraft reaches a threshold of a distance to the boundaries;
    providing a real time video from an infrared camera positioned on the aircraft of the runway or taxiway for identifying an obstacle, the infrared camera being synced to the direction of the gaze of the pilot as determined by the near-to-eye display; and
    displaying the obstacle on the near-to-eye display only when the aircraft reaches a threshold of a distance to the obstacle.

2. The method of claim 1 wherein the displaying step comprises:
    displaying a threat circle.

3. The method of claim 1 further comprising:
    determining the boundaries of the path by subtracting a distance from a plurality of lights outlining the path.

4. The method of claim 1 wherein the displaying step comprises:
    modifying a format of the boundaries when the vehicle approaches one of the boundaries.

5. The method of claim 1 further comprising:
    determining the boundaries by the steps comprising:
        determining the distance from a first plurality of markers on a first side of the taxiway to a second plurality of markers on a second side of the taxiway; and
        performing an algorithm to define the boundaries.

6. A system for viewing boundaries of an obstacle and at least one of a runway or a taxiway on which an aircraft is taxiing, comprising:
    a near-to-eye display configured to be positioned adjacent to an eye of a pilot of the aircraft;
    a flight management system configured to provide dimensions of the runway or taxiway;
    a navigation system configured to determine the location of the aircraft on the runway or taxiway;
    a controller configured to provide, in response to the dimensions of the runway or taxiway and the location of the aircraft, data including boundaries of the taxiway to the near-to-eye display for display thereon only when the aircraft reaches a threshold of a distance to the boundaries; and
    an infrared camera, providing a real time video of the runway or taxiway, and configured to be synced to the direction of the gaze of the pilot as determined by the near-to-eye display, and to display an obstacle identified by the infrared camera on the near-to-eye display.

7. The system of claim 6 wherein the controller is configured to determine the boundaries of the taxiway by subtracting a distance from a plurality of lights outlining the path.

8. The system of claim 6 wherein the controller is configured to modify a format of the boundaries when the vehicle approaches one of the boundaries.

* * * * *